US007082747B2

(12) United States Patent
Oishi et al.

(10) Patent No.: US 7,082,747 B2
(45) Date of Patent: Aug. 1, 2006

(54) CHAIN CONNECTING PIN EXTRACTING APPARATUS

(75) Inventors: Toshinari Oishi, Sakai (JP); Kenji Kamada, Osaka (JP)

(73) Assignee: Shimano, Inc., Sakai (JP)

( * ) Notice: Subject to any disclaimer, the term of this patent is extended or adjusted under 35 U.S.C. 154(b) by 288 days.

(21) Appl. No.: 10/853,963

(22) Filed: May 25, 2004

(65) Prior Publication Data

US 2004/0261392 A1 Dec. 30, 2004

(30) Foreign Application Priority Data

May 27, 2003 (JP) ............................ 2003-148926

(51) Int. Cl.
*B23P 19/04* (2006.01)
*B21L 9/06* (2006.01)
*B25B 13/00* (2006.01)

(52) U.S. Cl. ..................... 59/7; 59/11; 59/35.1; 29/257

(58) Field of Classification Search ...................... 59/7, 59/11, 35.1; 29/257
See application file for complete search history.

(56) References Cited

U.S. PATENT DOCUMENTS 1,469,594 A * 10/1923 Harley ............................ 59/7
2,826,893 A * 3/1958 Falk et al. ....................... 59/7
3,576,064 A 4/1971 Brackin
4,365,401 A 12/1982 Ogren
4,602,414 A 7/1986 Bartholomew et al.
4,635,437 A * 1/1987 Parton ............................. 59/7
5,140,736 A * 8/1992 Hsiao .............................. 59/7
5,251,341 A * 10/1993 Seals ............................... 59/7
2003/0084555 A1* 5/2003 Meggiolan ................... 29/257

FOREIGN PATENT DOCUMENTS

DE G 92 17 590.2 2/1993

OTHER PUBLICATIONS

Shimano 2003 Bicycle Components product catalog, p. 205, copyrighted 2002 and published prior to the filing date of this application in Japan.

* cited by examiner

*Primary Examiner*—David Jones
(74) *Attorney, Agent, or Firm*—James A. Deland

(57) ABSTRACT

A chain connecting pin extracting apparatus comprises a main body; a pin extractor support supported by the main body; and a pin extractor supported by the pin extractor support for movement in a direction of a pin extractor axis defined by the pin extractor. The pin extractor comprises a force receiving component adapted to receive a connecting pin extracting force; a tip adapted to apply the connecting pin extracting force to the connecting pin, wherein the tip is dimensioned to extend into a link pin opening in a first direction along the pin extractor axis; and a residue moving surface disposed between the force receiving component and the tip and facing at least in part in a second direction opposite the first direction.

21 Claims, 6 Drawing Sheets

CHAIN CONNECTING PIN EXTRACTING APPARATUS

BACKGROUND OF THE INVENTION

The present invention is directed to link chains and, more particularly, to a chain connecting pin extracting apparatus that may be used to remove a connecting pin that connects the links together.

Chain connecting pin extractors are tools used when modifying or replacing chains of the type that have alternating first and second link pairs pivotably connected together by a series of connecting pins. As shown in FIG. 4(A), for example, a narrow chain 50 may comprise pairs of outer links 51 that alternate with pairs of inner links 52 in an overlapping manner. A connecting pin 53 extends through aligned openings in the outer links 51 and inner links 52 to pivotably connect them together. Ring-shaped recesses 51*a* and 51*b* are formed on the outer sides of outer links 51, and expanded portions 53*a* and 53*b* of connecting pin 53 are crimped into the respective recesses 51*a* and 51*b* in order to securely join the links together. As a result, the diameters of the ends of connecting pin 53 are greater than the diameter of the central portion of connecting pin 53. A roller 54 surrounding connecting pin 53 is rotatably supported by the inner link 52. Because connecting pin 53 is crimped into recesses 51*a* and 51*b* of outer links 51, it is less likely to protrude beyond the sides of outer links 51, thus further reducing the width of chain 50.

A chain connecting pin extractor typically removes the connecting pin of a closed-loop chain so that the links connected by the connecting pin may be separated to thereby open the loop. A chain connecting pin extractor used to modify or replace a bicycle chain is disclosed at page 205 of *Shimano* 2003 *Bicycle Components*, a retail sales manual published by Shimano Inc.

Conventional chain connecting pin extractors comprise a main body, a pin extractor and a handle component used to operate the pin extractor. The main body has a female threaded component and a link support, wherein the female threaded component is aligned with the connecting pin when the chain is mounted to the main body, and the link support supports the outer link of the chain in the axial direction of the connecting pin. The handle component has a male threaded component that screws into the female threaded component, and the pin extractor is detachably connected to the tip of the male threaded component. A diameter of a tip of the pin extractor is smaller than a diameter of the connecting pin, and a diameter of the portion of the pin extractor that connects to the male threaded component is larger than the diameter of the tip.

To use the chain connecting pin extractor, the chain is mounted to the main body such that the connecting pin that is to be removed faces the pin extractor. Turning the handle component causes the pin extractor to press against and move the connecting pin while the chain is prevented from moving by the link support. The links may be disconnected when the connecting pin is removed from at least the outer link that faces the handle component.

In the bicycle field, a chain may be used with sprocket clusters having as many as ten sprockets, wherein a derailleur is used to switch the chain among the individual sprockets. Because the sprocket cluster must fit in the limited axial space between the bicycle frame components that straddle the rear wheel, a larger number of sprockets results in narrower gaps between the sprockets, so the chain also must be thinner. A chain such as the one described above, wherein the connecting pin does not protrude axially outward from the outer links, may be used for this purpose When the links of such narrow chains are disconnected using a conventional chain connecting pin extractor, the expanded portion of the connecting pin that faces the pin extractor sometimes breaks off from the remainder of the connecting pin, thus leaving a ring-shaped residue in the ring-shaped recess in the outer link. This residue makes it difficult if not impossible to insert a replacement pin, so the residue must be removed using a different tool.

SUMMARY OF THE INVENTION

The present invention is directed to various features of a chain connecting pin extracting apparatus. In one embodiment, a chain connecting pin extracting apparatus is provided for extracting a connecting pin that couples a first link to a second link through a pin opening disposed in the first link. The apparatus comprises a main body; an extractor support supported by the main body; and an extractor supported by the extractor support for movement in a direction of a pin extractor axis defined by the pin extractor. The pin extractor comprises a force receiving component adapted to receive a connecting pin extracting force; a tip adapted to apply the connecting pin extracting force to the connecting pin, wherein the tip is dimensioned to extend into the pin opening in a first direction along the pin extractor axis; and a residue moving surface disposed between the force receiving component and the tip and facing at least in part in a second direction opposite the first direction so that, after the tip extends in the first direction into the pin opening, movement of the pin extractor in the second direction causes the residue moving surface to move residue of the connecting pin disposed at the first link that was caused by movement of the tip in the first direction. A link support may be spaced apart from the extractor support in a direction of the pin extractor axis so that at least one of the first link and the second link is supported by the link support when the extractor moves in the first direction.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
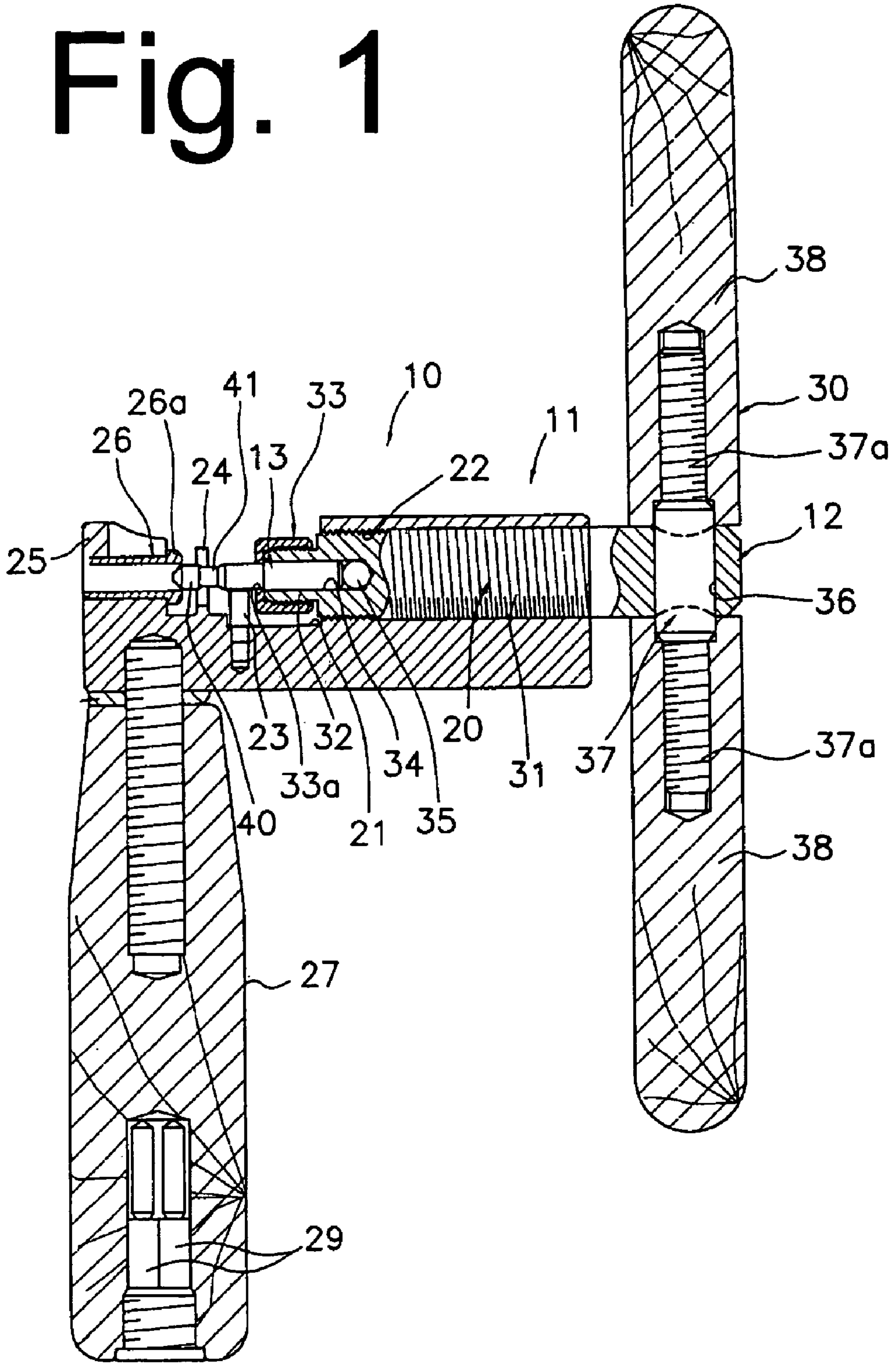
FIG. 1 is a cross sectional view of a particular embodiment of a chain connecting pin extracting apparatus in the form of a complete chain connecting pin extracting device.
Figure 2:
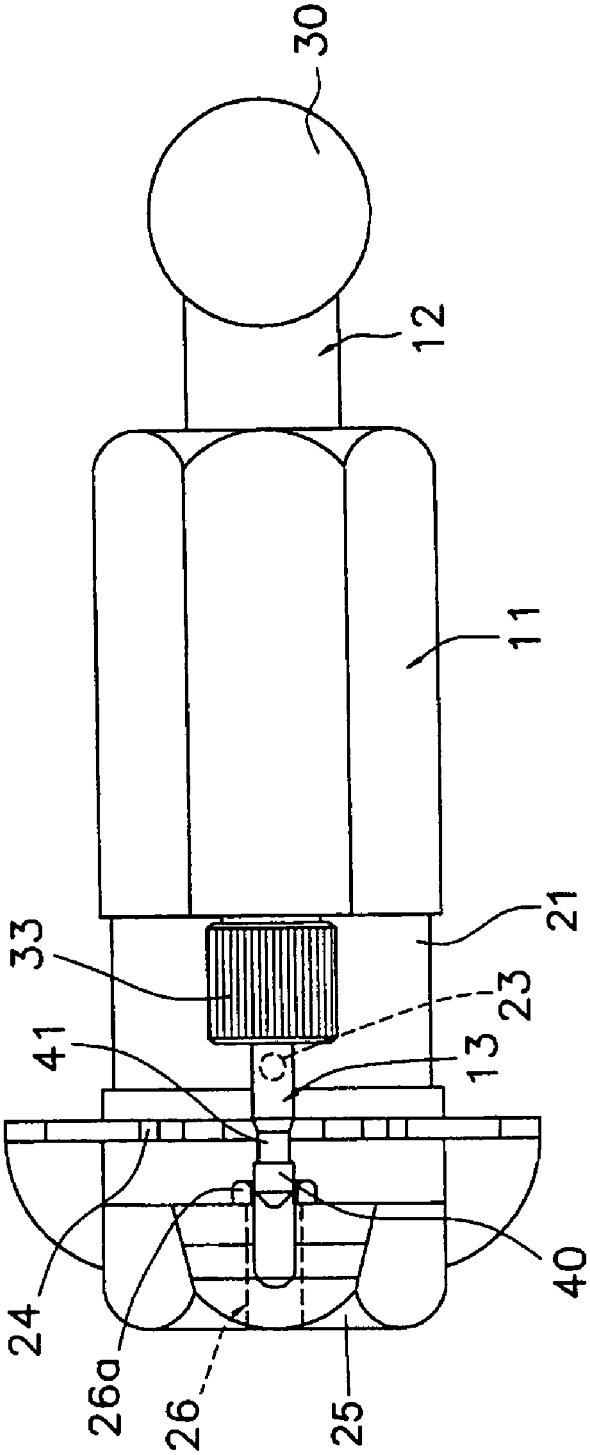
FIG. 2 is a plan view of the chain connecting pin extracting device.

FIG. 1 is a cross sectional view of a particular embodiment of a chain connecting pin extracting apparatus in the form of a complete chain connecting pin extracting device 10, and FIG. 2 is a plan view of chain connecting pin extracting device 10. In this embodiment, chain connecting pin extracting device 10 comprises a main body 11, a pin extractor support in the form of a force applying unit 12 including a shaft 20 with a male threaded component 31 that screws into a female threaded component 22 formed in main body 11, and a pin extractor 13 connected to the tip of shaft 20. A wooden grip 27 is screwed into the longitudinal side of main body 11, and a storage space is formed in grip 27 for storing two connecting pins 29 that are used to replace the connecting pin 53 discussed above after connecting pin 53 is removed from chain 50.

Main body 11 is a generally hexagonal-shaped cylindrical member with a mounting recess 21 formed therein. A support pin 23 is mounted in mounting recess 21 for supporting pin extractor 13, and a plurality of positioning protrusions 24 are disposed in mounting recess 21 for positioning chain 50 during the extraction operation. Positioning protrusions 24 are formed in the same shape as the teeth of the sprockets engaged by chain 50 and are oriented such that, when chain 50 is positioned on positioning protrusions 24, connecting pin 53 aligns with pin extractor 13. A link support in the form of a positioning bracket 25 with a bushing 26 having a flanged tip 26*a* is provided for restricting axial movement of the outer links 51 of chain 50 as connecting pin 53 is pushed by pin extractor 13. Bushing 26 has a through hole with a diameter large enough to receive connecting pin 53 therein. The top of bushing 26 and the corresponding top part of positioning bracket 25 are open to allow the extracted connecting pin 53 to be removed.

An extractor attachment component 32 having a smaller diameter than the male threaded component 31 of shaft 20 is formed at the inner tip of shaft 20, and a cylindrical holder 33 for detachably mounting pin extractor 13 is screwed onto extractor attachment component 32. An engagement hole 33*a* for engaging pin extractor 13 is formed in the bottom of holder 33, and a mounting hole 34 for mounting pin extractor 13 is formed in the center of extractor attachment component 32.

A hand grip 30 is mounted to the outer end of shaft 20 through a mounting shaft 37 that extends through a handle attachment hole 36 formed diametrically through the outer end of shaft 20. Hand grip 30 includes two wooden grips 38 with female threaded components that engage male threaded components 37*a* formed on opposite ends of mounting shaft 37. Rotation of hand grip 30 causes extractor 13 to move in a direction of a pin extractor axis defined by the longitudinal direction of pin extractor 13. The pin extractor axis is generally coaxial with a connecting pin axis that is defined by the longitudinal direction of connecting pin 53 when chain 50 is positioned for removal of connecting pin 53.

A steel ball bearing 35 is mounted in the bottom of mounting hole 34 so that pin extractor 13 is rotatable relative to shaft 20. Thus, when the tip of pin extractor 13 contacts connecting pin 53 and hand grip 30 is rotated, pin extractor 13 rotates relative to connecting pin 53 until the contact force becomes large, and then pin extractor 13 rotates relative to shaft 20 to avoid any drilling effect on connecting pin 53. The rotation of pin extractor 13 relative to shaft 20 also allows pin extractor 13 to be firmly positioned on connecting pin 53 during the extraction operation.

Figure 3:
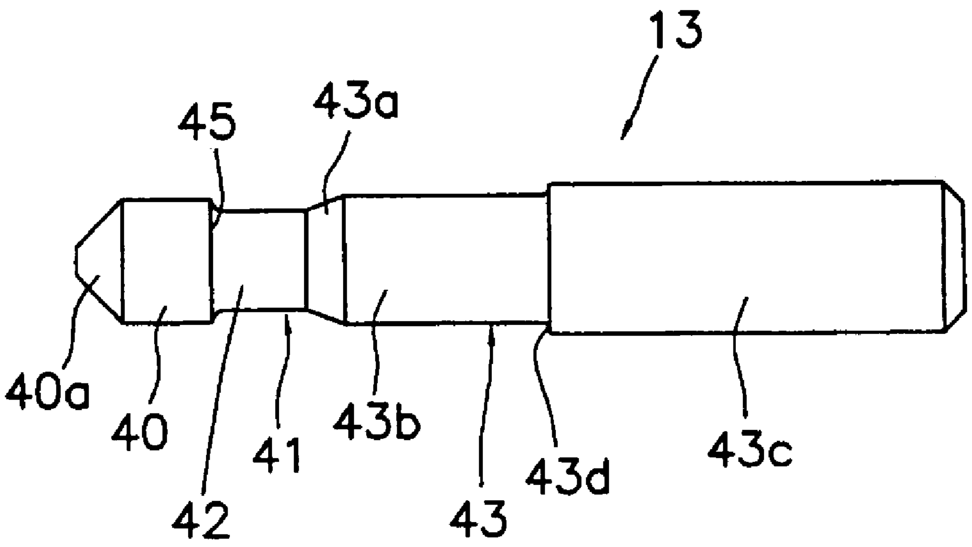
FIG. 3 is a view of a chain connecting pin extracting apparatus in the form of a chain connecting pin extractor.

As shown in FIG. 3, pin extractor 13 comprises a tip 40 and a force receiving component 41 integrally formed with and extending from tip 40. Tip 40 is adapted to apply a chain connecting pin extracting force to connecting pin 53 and includes a tapered surface 40*a*, and force receiving component 41 is adapted to receive the chain connecting pin extracting force from force applying unit 12. Tip 40 has a diameter that is smaller than a diameter of connecting pin 53 and an axial length that is shorter than an axial length of connecting pin 53. Force receiving component 41 comprises a residue receiving component 42 and a shaft interface component 43. Residue receiving component 42 forms a first portion of force receiving component 41, and it has a diameter smaller than the diameter of tip 40 so as to form a residue removing surface 45 at a junction with tip 40. In this embodiment, residue removing surface 45 is oriented substantially perpendicular to the extractor and pin axes.

Shaft interface component 43 comprises a tapered section 43*a*, an intermediate section 43*b* that forms a second portion of force receiving component 41, and a shaft connecting component 43*c* that forms a third portion of force receiving component 41. Shaft connecting component 43*c* is inserted into the mounting hole 34 of shaft 20. Intermediate section 43*b* has a diameter larger than the diameter of residue receiving component 42 and smaller than a diameter of engagement hole 33*a* of holder 33, and shaft connecting component 43*c* has a diameter larger than intermediate section 43*b* to form an abutment 43*d* at the junction with intermediate section 43*b*. Abutment 43*d* engages the bottom of holder 33 when holder 33 is screwed onto the extractor attachment component 32 so that pin extractor 13 is retained to shaft 20. The shape and dimensions of intermediate section 43*b* and shaft connecting component 43*c* of pin extractor 13 are the same as conventional pin extractors. Thus, a pin extractor constructed according to the teachings herein may be used with conventional pin extracting devices.

Figure 4A:
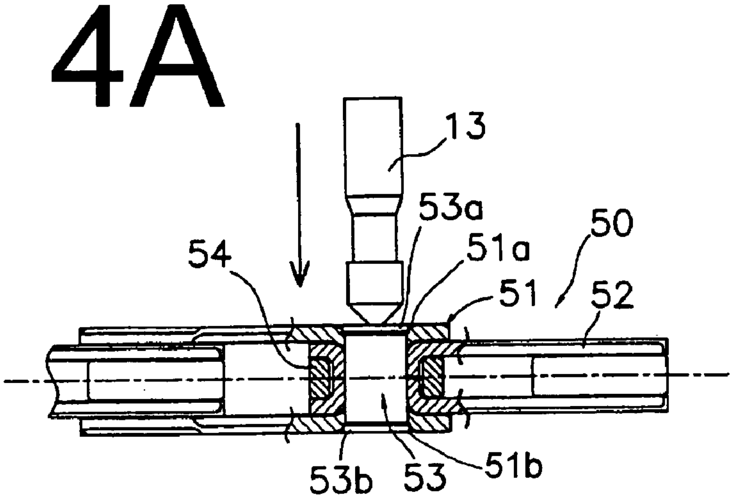
FIGS. 4(A)–4(C) are views illustrating a chain connecting pin extracting operation.
Figure 4B:
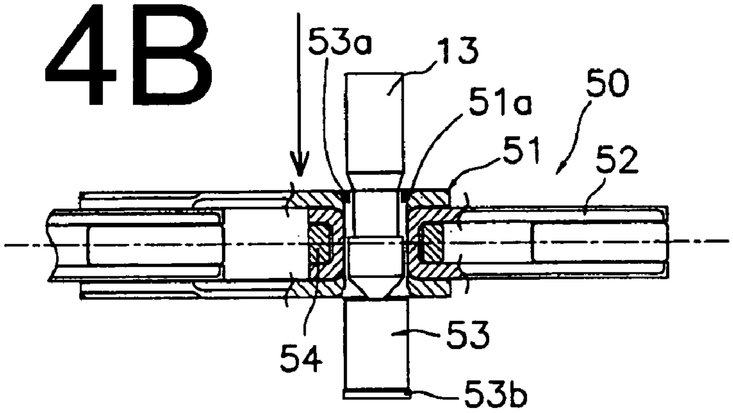
Figure 4C:
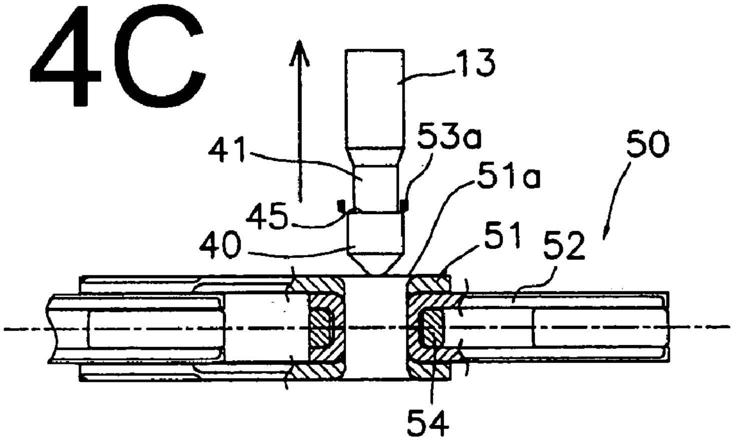

The operation of chain connecting pin extracting device 10 is shown in FIGS. 4(A)–4(C). Initially, hand grip 30 is rotated counterclockwise (when facing hand grip 30) to retract pin extractor 13 sufficiently to allow chain 50 to be positioned in mounting recess 21. Chain 50 then is mounted on positioning protrusions 24 so that the connecting pin 53 to be extracted faces pin extractor 13. When hand grip 30 is rotated clockwise, pin extractor 13 advances until the free end of tip 40 contacts connecting pin 53 as shown in FIG. 4(A). The flanged tip 26*a* of bushing 26 simultaneously prevents the corresponding outer link 51 from moving in the pushed direction indicated by the arrow in FIG. 4(A).

Further rotation of hand grip 30 causes pin extractor 13 to push connecting pin 53 out of the opposite side of chain 50 as shown in FIG. 4(B). At this time, the expanded portion 53*a* of connecting pin 53 adjacent to tip 40 (now termed the residue 53*a*) may remain in the corresponding recess 51*a*. If residue 53*a* is left in that position, it will obstruct the positioning of the new spare pin 29 and prevent the spare pin 29 from being mounted properly. However, as shown in FIG. 4(C), when hand grip 30 is rotated in the counterclockwise direction to retract pin extractor 13 after connecting pin 53 has been removed, residue 53*a* is caught by residue removing surface 45, thus allowing residue 53*a* to be removed from recess 51*a*.

Figure 5A:
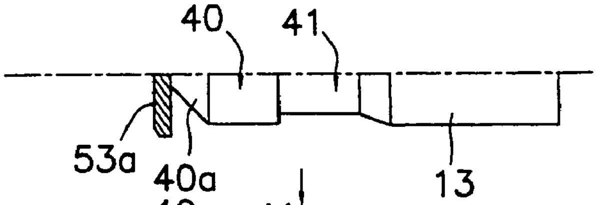
FIGS. 5(A)–5(D) are views illustrating how chain connecting pin residue is formed during the chain connecting pin extracting operation.
Figure 5B:
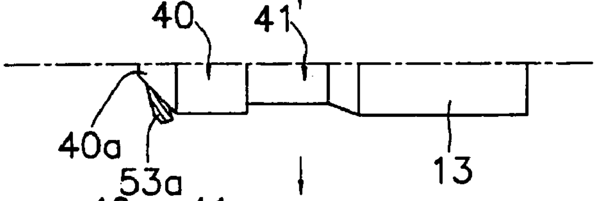
Figure 5C:
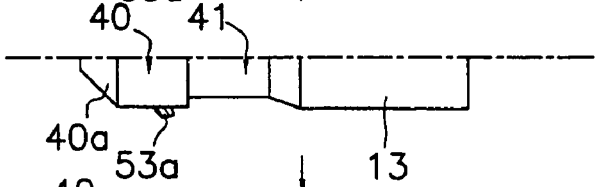
Figure 5D:
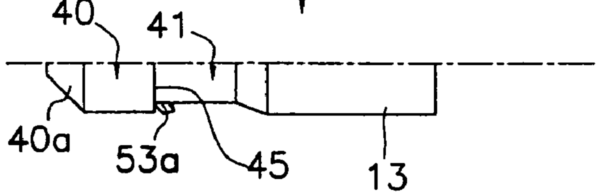

It is not entirely clear why residue 53*a* is caught by residue removing surface 45 when pin extractor 13 is retracted. FIGS. 5(A)–5(D) illustrate one possible explanation. Since tapered surface 40*a* is formed on tip 40, the expanded portion 53*a* of connecting pin 53 may incline and break off during the extraction operation as shown in FIG. 5(B). After residue 53*a* breaks off, the ring so formed is stretched in diameter as it moves along tapered surface 40*a* and onto the constant diameter portion of tip 40 as shown in FIG. 5(C). After residue 53*a* clears residue removing surface 45 and enters the smaller diameter residue receiving component 42, residue 53*a* contracts in diameter and therefore contacts residue removing surface 45 as shown in FIG. 5(D) when pin extractor 13 is retracted.

Another possible explanation is that, when pin extractor 13 is retracted, residue 53*a* might be deformed or skewed by the rotation of pin extractor 13, and the skewed residue 53*a* might be caught by residue removing surface 45 as pin extractor 13 is retracted. In any event, it is assumed that residue 53*a* contracts in diameter after is passes residue removing surface 45, even in the absence of tapered surface 40*a*, so tapered surface 40*a* is not considered an essential component. Residue 53*a* then will be caught and easily removed by residue removing surface 45, thus allowing proper installation of the new spare pin 29.

While the above is a description of various embodiments of inventive features, further modifications may be employed without departing from the spirit and scope of the present invention. For example, while a chain connecting pin extracting device capable of mass production was described, many other configurations are possible. For example, as shown in FIGS. 6(A)–6(D), a spring member 120 for removing residue can be provided in the residue receiving component 42 of a pin extractor 113. In this embodiment, spring member 120 has a diameter smaller than connecting pin 53 and larger than tip 40.

Figure 6A:
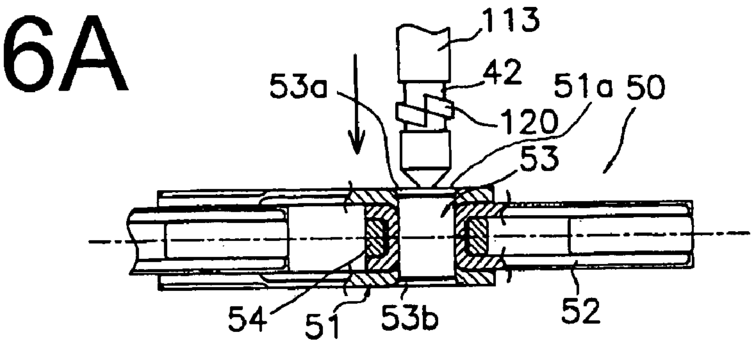
FIGS. 6(A)–6(D) are views illustrating the operation of another embodiment of a chain connecting pin extracting apparatus.
Figure 6B:
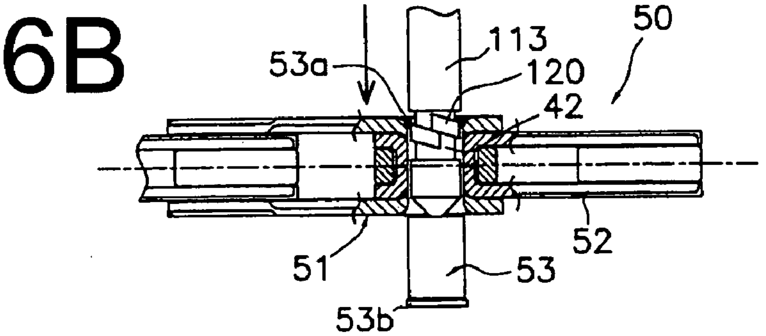
Figure 6C:
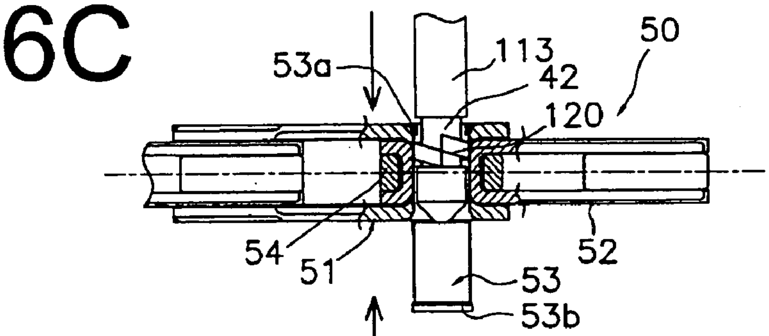
Figure 6D:
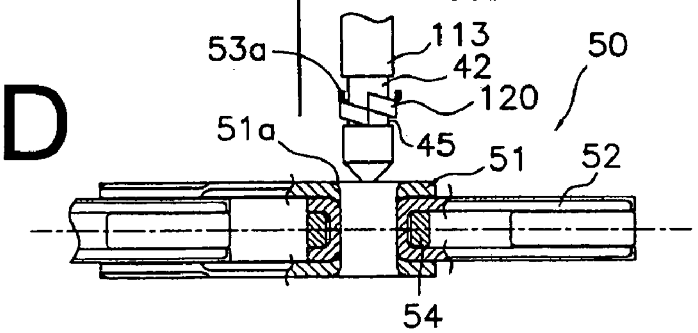

Operation of this embodiment is substantially the same as the first embodiment. However, when residue 53*a* passes residue removing surface 45, residue 53*a* contracts spring member 120 diametrically as shown in FIG. 6(B) so that spring member 120 passes through the central opening of residue 53*a*. Spring member 120 subsequently expands after it passes by residue 53*a* as shown in FIG. 6(C). Thereafter, spring member 120 removes residue 53*a* from recess 51*a* when pin extractor 113 is retracted as shown in FIG. 6(D). If for some reason spring member 120 does not catch residue 53*a*, then residue 53*a* will be caught and removed by residue removing surface 45 of extractor pin 113.

In the described embodiments, a tapered section 43*a* is formed between residue receiving component 42 and intermediate section 43*b* of pin extractor 13. This tapered section 43*a* may be omitted, but providing tapered section 43*a* allows residue to be caught and removed by tapered section 43*a* when several residue pieces are left in residue receiving component 42.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A chain connecting pin extracting apparatus for extracting a connecting pin that couples a first link to a second link through a pin opening disposed in the first link, wherein the apparatus comprises:

a main body;

a pin extractor support supported by the main body;

a pin extractor supported by the pin extractor support for movement in a direction of a pin extractor axis defined by the pin extractor, wherein the pin extractor comprises:

a force receiving component adapted to receive a connecting pin extracting force;

a tip adapted to apply the connecting pin extracting force to the connecting pin, wherein the tip is dimensioned to extend into the pin opening in a first direction along the pin extractor axis; and a residue moving surface disposed between the force receiving component and the tip and facing at least in part in a second direction opposite the first direction so that, after the tip extends in the first direction into the pin opening, movement of the pin extractor in the second direction causes the residue moving surface to move residue of the connecting pin disposed at the first link that was caused by movement of the tip in the first direction; and a link support spaced apart from the pin extractor support in a direction of the pin extractor axis so that at least one of the first link and the second link is supported by the link support when the pin extractor moves in the first direction.

2. The apparatus according to claim 1 wherein the main body comprises a female threaded component.

3. The apparatus according to claim 2 wherein the pin extractor support further comprises a force applying unit having a male threaded component that engages the female threaded component, and wherein the force applying unit supports the pin extractor so that rotation of the force applying unit moves the pin extractor in the first and second directions.

4. The apparatus according to claim 3 wherein the force applying unit further comprises a handle having an elongated portion that extends at least partially in a direction perpendicular to the pin extractor axis.

5. The apparatus according to claim 3 wherein the pin extractor support comprises a holder that detachably couples the pin extractor to the pin extractor support.

6. The apparatus according to claim 5 wherein the pin extractor is coupled to the force applying unit through a bearing so that the force applying unit is rotatable relative to the pin extractor.

7. The apparatus according to claim 1 wherein the force receiving component has a first portion extending from the tip, and wherein the first portion has a diameter smaller than a diameter of the tip at a junction of the first portion and the tip so as to form the residue moving surface.

8. The apparatus according to claim 7 wherein the residue moving surface is oriented substantially perpendicular to the pin extractor axis.

9. The apparatus according to claim 7 wherein a free end of the tip forms a tapered surface.

10. The apparatus according to claim 7 wherein the force receiving component has a second portion extending from the first portion, and wherein the second portion has a diameter larger than the diameter of the first portion.

11. The apparatus according to claim 10 wherein a junction of the first portion and the second portion forms a tapered section.

12. The apparatus according to claim 10 wherein the force receiving component has a third portion extending from the second portion, wherein the third portion is supported by the pin extractor support.

13. The apparatus according to claim 12 wherein the diameter of the second portion is smaller than a diameter of the third portion.

14. A pin extractor for a connecting pin extracting apparatus that extracts a connecting pin that couples a first link to a second link through a pin opening disposed in the first link, wherein the connecting pin extracting apparatus is of the type comprising a main body, a pin extractor support supported by the main body for supporting the pin extractor along a pin extractor axis, and a link support spaced apart from the pin extractor support in a direction of the pin extractor axis, and wherein the pin extractor support moves along the pin extractor axis to apply a connecting pin extracting force to the connecting pin while at least one of the first and second links is supported by the link support, wherein the pin extractor comprises:

a force receiving component adapted to receive the connecting pin extracting force;

a tip adapted to apply the connecting pin extracting force to the connecting pin, wherein the tip is dimensioned to extend into the pin opening in a first direction along the pin extractor axis; and a residue moving surface disposed between the force receiving component and the tip and facing at least in part in a second direction opposite the first direction so that, after the tip extends in the first direction into the pin opening, movement of the pin extractor in the second direction causes the residue moving surface to move residue of the connecting pin disposed at the first link that was caused by movement of the tip in the first direction.

15. The pin extractor according to claim 14 wherein the force receiving component has a first portion extending from the tip, and wherein the first portion has a diameter smaller than a diameter of the tip at a junction of the first portion and the tip so as to form the residue moving surface.

16. The pin extractor according to claim 15 wherein the residue moving surface is oriented substantially perpendicular to the pin extractor axis.

17. The pin extractor according to claim 15 wherein a free end of the tip forms a tapered surface.

18. The pin extractor according to claim 15 wherein the force receiving component has a second portion extending from the first portion, and wherein the second portion has a diameter larger than the diameter of the first portion.

19. The pin extractor according to claim 18 wherein a junction of the first portion and the second portion forms a tapered section.

20. The pin extractor according to claim 18 wherein the force receiving component has a third portion extending from the second portion, wherein the third portion is adapted to be supported by the pin extractor support.

21. The pin extractor according to claim 20 wherein the diameter of the second portion is smaller than a diameter of the third portion.

* * * * *